Figure 1:
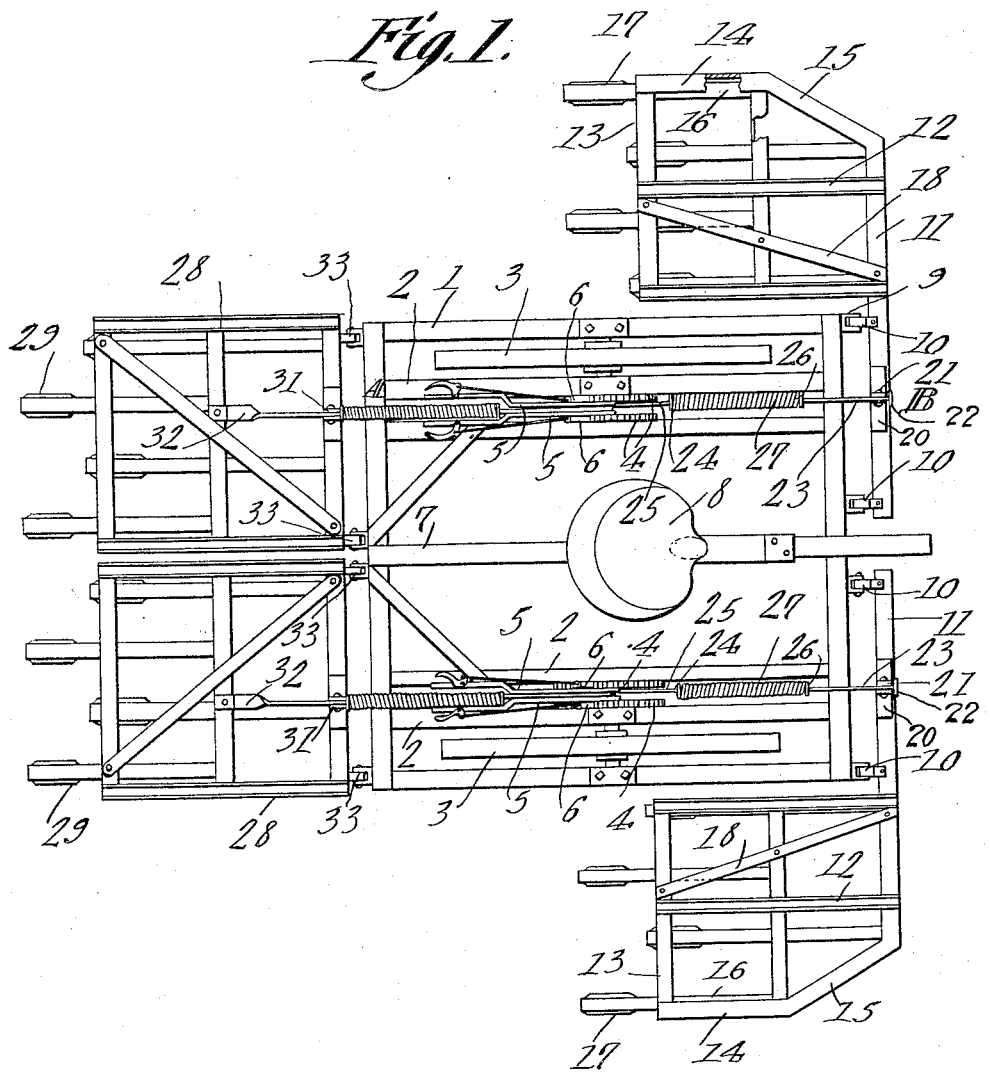

C. E. FORKNER.
HARROW.
APPLICATION FILED MAR. 19, 1915.

1,163,227.

Patented Dec. 7, 1915.
2 SHEETS—SHEET 1.

Witnesses
J. R. Tomlin
R. L. Parker

C. E. Forkner
Inventor
by C. A. Snow & Co.
Attorneys

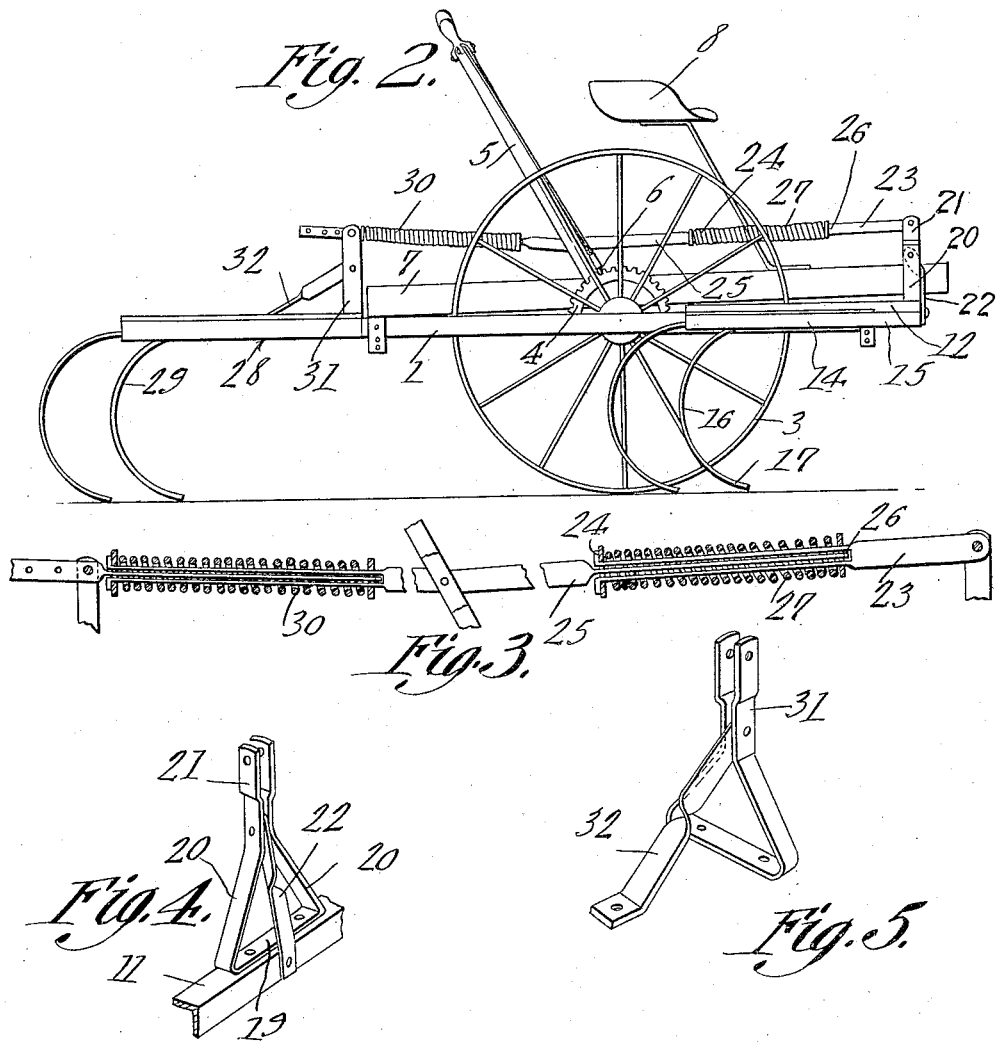

UNITED STATES PATENT OFFICE.

CHARLES E. FORKNER, OF MARSHALLTOWN, IOWA.

HARROW.

1,163,227.  Specification of Letters Patent.  Patented Dec. 7, 1915.

Application filed March 19, 1915. Serial No. 15,505.

*To all whom it may concern:*

Be it known that I, CHARLES E. FORKNER, a citizen of the United States, residing at Marshalltown, in the county of Marshall and State of Iowa, have invented a new and useful Harrow, of which the following is a specification.

This invention relates to harrows, one of its objects being to provide a wheel supported structure having harrow sections adjustably connected to the rear portion thereof and additional harrow sections adjustably connected to the sides at the front of the structure, there being means located within convenient reach of the driver for adjusting any one of the sections angularly, thus to vary the depth of the cut.

A further object is to provide actuating means for the adjustable sections which include means for holding the teeth of the harrow sections pressed yieldingly against the surface of the ground, thus rendering the structure especially desirable for use on uneven ground.

A further object is to so mount the side sections of the harrow as to permit the adjusting means to be located close to the seat occupied by the driver.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a plan view of the harrow. Fig. 2 is a side elevation thereof. Fig. 3 is an enlarged section on line A—B Fig. 1. Fig. 4 is a perspective view of one of the brackets of the side sections. Fig. 5 is a perspective view of one of the brackets on the rear sections.

Referring to the figures by characters of reference 1 designates the main frame of the harrow, the same being preferably formed of angle strips, there being longitudinal strips 2 adjacent the sides of the frame and disposed in pairs. Between each side of the frame and the adjacent pair of longitudinal strips 2 is journaled a supporting wheel 3 and mounted on each of the strips 2 is a toothed segment 4 and an adjusting lever 5. Each adjusting lever carries a dog 6 of the usual form for engaging its segment, thus to hold the lever in any position to which it may be shifted. A draft beam 7 is extended longitudinally along the center portion of the main frame and is designed to support the seat 8 to be occupied by the driver, this seat being located between the segments 4 so that all of the levers can be readily reached and actuated by the occupant of the seat.

Secured to the front of the frame 1 are brackets 9 arranged in pairs, the brackets of each pair being pivotally engaged by hinge members 10 extending rearwardly from a front angle bar 11. Two of these front bars 11 are provided, each bar extending laterally beyond one side of the main frame 1. Formed on the laterally projecting portion of each of the bars 11 is a harrow section consisting of longitudinal channel bars 12 to which are secured transversely extending angle bars 13, the outer ends of these angle bars 13 being connected by a side bar 14, the front end portion of which is diagonally disposed as at 15 to constitute a deflector. To the angle bars 13 are connected the spring shanks 16 of soil engaging members 17. Certain of the spring shanks 16 can also be connected to the laterally extending portion of the front bar 11, as shown. Also any suitable arrangement of braces 18 may be provided for stiffening the harrow section against lateral distortion.

Both of the side sections of the harrow are similar in construction with the exception that one is especially designed for use at the right side of the harrow, while the other is constructed for use at the left side.

Secured to that portion of each bar 11 directly in front of the main frame 1 is an upstanding bracket such as shown in detail in Fig. 4, the said bracket being preferably formed of a single length of metal folded to form a base 19, upwardly converging sides 20 and upwardly extending arms 21. A supplemental brace 22 is secured at its upper end between the arms 21 and at its lower end to the bar 11. Pivotally mounted between the upper ends of the arms 21 is a bar 23 having a head or enlargement 24 at its rear end, said bar being disposed in lapped relation with another bar 25 having a head 26 at its front end. A coiled spring 27 is interposed between the heads 24 and 26 and extends around those portions of the bars 23 and 25 between the heads. Bar 24 is connected to one of the levers 5. Thus it will be seen that by manipulating said lever a direct pull can be exerted through the bars 25 and 23 and the spring 27 upon the arms 21, thus causing the bar 11 to swing upon its hinge connection with the frame 1, thereby forcing the soil engaging devices 17 into the soil. The spring 27 constitutes means for permitting the soil engaging devices and the harrow section to yield upwardly when the section is moving over an uneven surface and spring 27 likewise constitutes means for pressing the soil engaging devices constantly against the ground. Importance is attached to the fact that although the sections of the harrow are located beyond the sides of the frame 1, the levers employed for adjusting said sections angularly are arranged on the frame 1 and push and pull along lines extending parallel with the path of movement of the harrow so that there is thus no necessity of providing any laterally extending connections between the side sections of the harrow and the levers.

Mounted back of the main frame 1 are harrow sections 28 similar in construction to the sections hereinbefore described with the exception that they are substantially rectangular and are not necessarily provided with deflecting portions corresponding with the portions 15. Each of these sections 28 has soil engaging members 29 connected to it and each section is connected to one of the levers 5 by bars and a spring similar to the bars 23 and 25 and spring 27. Consequently these rear sections 28 can be adjusted downwardly or upwardly relative to the ground, the springs 30, which correspond with the springs 27, exerting a constant thrust against the brackets 31 which upstand from the front end portions of the sections 28 and are similar to the brackets hereinbefore described. Furthermore these springs will yield should one of the harrow sections 28 be forced upwardly, as when moving over an elevated portion of the ground.

It will be seen that each of the brackets 31 has a brace 32 extending downwardly and rearwardly therefrom and attached to the section on which the bracket is mounted. The hinge connections 33 between the front ends of the sections 28 and the back of the frame 1 are similar to the connections between the bars 11 and the front end of the frame 1.

It has been found that a harrow such as herein described is especially useful in the cultivation of orchards inasmuch as the side sections can travel readily under low limbs of fruit trees without injuring the trees in any way. A further advantage in the present structure is that all of the controlling levers are located close to the seat 8 where they can be easily reached, that they all exert their force along lines parallel with the path of movement of the machine in effecting the angular adjustment of the harrow sections, this being especially advantageous as regards the side sections of the harrow as it has heretofore been necessary to provide some laterally extending operating means in order to adjust the side sections.

What is claimed is:—

1. A harrow comprising a main wheel supported frame, side sections adjacent the front of the harrow, a bar integral with the front portion of each of said side sections and extending partly across the front of the main frame, hinge connections between said bars and the front of the main frame, operating levers upon the main frame, and connections between said levers and those portions of the bars in front of the main frame, for adjusting the side sections angularly.

2. A harrow including a main wheel supported frame, bars hingedly connected to the front end thereof and extending laterally therebeyond, side harrow sections formed with the bars, brackets upstanding from the bars at points in front of the main main frame, adjusting levers mounted on the main frame, and yieldable connections between the brackets and the respective levers.

3. A harrow including a main frame, bars hingedly connected to the front portion thereof and extending laterally therebeyond, harrow sections formed on the laterally projecting portions of the bars and movable therewith, adjusting levers upon the main frame, brackets upstanding from those portions of the bars in front of the frame, and yieldable means connecting the levers and the respective bars whereby angular adjustment of the bars and harrow sections is effected.

4. A harrow including a main frame, harrow sections hingedly connected to the back of the frame, bars hingedly connected to the front of the frame and extending laterally therebeyond, side harrow sections carried by and adjustable with the bars, levers mounted on the main frame, and yieldable connections between certain of the levers and the rear harrow sections and between the remaining levers and the bars of the side harrow sections.

5. A harrow comprising a main wheel supported frame, a side section adjacent the front of the frame, a transverse bar integral with said side section and extending in front of the main frame, a hinge connection between said bar and the front of the main frame, an operating lever upon the main frame, and a connection between said lever and that portion of the bar in front of the main frame, for adjusting the side section angularly.

In testimony that I claim the foregoing as my own, I have hereto affixed my signature in the presence of two witnesses.

CHARLES E. FORKNER.

Witnesses:
 FRED W. CARL,
 ROY C. WARRING.

Copies of this patent may be obtained for five cents each, by addressing the "Commissioner of Patents, Washington, D. C."